US011178395B1

(12) United States Patent
Swaminathan

(10) Patent No.: US 11,178,395 B1
(45) Date of Patent: Nov. 16, 2021

(54) METHODS, MEDIUMS, AND SYSTEMS FOR DYNAMICALLY SELECTING CODECS

(71) Applicant: WhatsApp Inc., Menlo Park, CA (US)

(72) Inventor: Arvind Swaminathan, San Jose, CA (US)

(73) Assignee: WHATSAPP LLC, Menlo Park, CA (US)

( * ) Notice: Subject to any disclaimer, the term of this patent is extended or adjusted under 35 U.S.C. 154(b) by 0 days.

(21) Appl. No.: 16/897,595

(22) Filed: Jun. 10, 2020

(51) Int. Cl.
*H04N 19/103* (2014.01)
*H04N 19/154* (2014.01)

(52) U.S. Cl.
CPC ......... *H04N 19/103* (2014.11); *H04N 19/154* (2014.11)

(58) Field of Classification Search
CPC .. H04N 19/164; H04N 19/156; H04N 19/115; H04N 21/234309; H04N 21/2402; H04N 21/2404; H04N 21/2401
USPC .......... 375/240.02, 240.01–240.29; 370/230, 370/235
See application file for complete search history.

(56) References Cited

U.S. PATENT DOCUMENTS

| 10,045,089 | B2 * | 8/2018 | Jeong | H04N 21/6379 |
| 10,855,996 | B2 * | 12/2020 | Amini | H04L 5/0053 |
| 2005/0213610 | A1 * | 9/2005 | Yu | H04M 7/0072 370/477 |
| 2008/0279097 | A1 * | 11/2008 | Campion | H04L 47/10 370/229 |
| 2015/0263961 | A1 * | 9/2015 | Assem Aly Salama | H04L 65/403 370/235 |
| 2019/0104306 | A1 * | 4/2019 | Wang | H04N 19/179 |

* cited by examiner

*Primary Examiner* — Nathnael Aynalem
(74) *Attorney, Agent, or Firm* — Kacvinsky Daisak Bluni PLLC

(57) ABSTRACT

Exemplary embodiments relate to techniques for dynamically selecting codecs as video is transmitted in real time. In some embodiments, a first codec initially encodes video data, and a second codec is evaluated to replace the first codec. The system switches to the second codec only if an increased amount of power consumption resulting from using the second codec balances with a correspondingly sufficient increase in the quality of the video encoded by the second codec. In some embodiments, codecs are excluded from consideration if it is determined that the local device does not have sufficient processing resources to operate the codec, or if a mismatch is detected between the codec operating on a sending device and a codec operating on a receiving device.

17 Claims, 10 Drawing Sheets

A

B

C

D E

METHODS, MEDIUMS, AND SYSTEMS FOR DYNAMICALLY SELECTING CODECS

BACKGROUND

Computing devices can run a variety of different applications, some of which may capture video and transmit the video over a network. For instance, a video conferencing application might send and receive video in real time over the Internet.

The video may be encoded at a sending device, and decoded at a receiving device, by a codec. A codec may compress or otherwise manipulate the video data in order to fit the video data transmission into a bit rate that can be supported by the network. Many different codecs exist, and different codecs may come with different costs and benefits (e.g., in terms of battery consumption, encoded video quality, throughput, etc.).

Codecs come in two different types: hardware codecs, which are generally hard-coded into a processing circuit, and software codecs, which are software applications that can be run on a special- or general-purpose processor. A hardware codec may perform well in high-bandwidth scenarios, using less power and processing resources than a software codec when high-quality media encodings are being produced. However, hardware codecs may perform poorly in low-bandwidth scenarios by producing low-quality media encodings and poorly regulating themselves to stay within bandwidth caps. A software media encoder may perform well in low-bandwidth scenarios, producing relatively high-quality encodings given the bandwidth limit and obeying the bandwidth limit. However, they tend to perform poorly in high-bandwidth scenarios in which they will consume considerable power and processing resources.

The codec used to encode the video at the sending device needs to be compatible with the codec used to decode the video at the receiving device. Conventionally, the sending device and receiving device negotiate (potentially with the assistance of an intermediate server) to determine a list of codecs that are supported by both the sending device and the receiving device. The sending device then chooses from among the compatible codecs on the list, typically by applying predefined rules that select a given codec to be applied under certain network conditions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
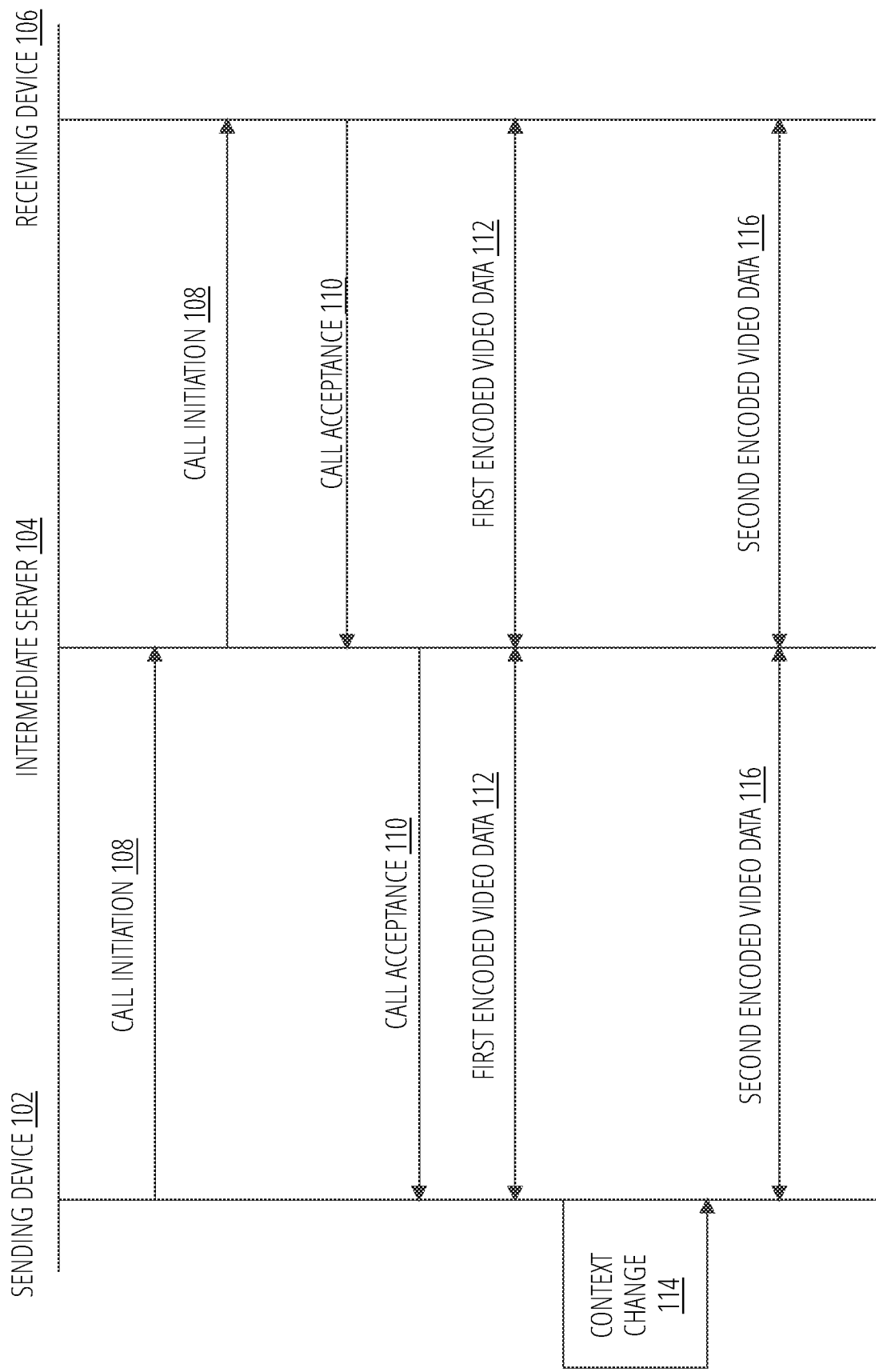
FIG. 1 depicts an exemplary exchange of data between devices that select and apply codecs to encode a stream of video data.

Several problems can arise when selecting a codec according to traditional methods. Especially on mobile devices where power management is a concern, it would generally be preferable to use hardware codecs as much as possible. However, different manufacturers may implement the same hardware codec in different ways. Those differences can give rise to incompatibilities, causing errors when decoding the video.

Hardware codecs are also prone to "overshoot," a situation in which the codec encodes more data than the network can transmit. This can be especially problematic when video is transmitted in real time, because the transmitting device has only a limited ability to buffer data to smooth out the transmission.

In some cases, a new codec may be made available and may be rolled out on older or legacy hardware. Although the hardware may technically be capable of applying the codec, the codec may require more processing resources than the hardware is reasonably capable of providing. Hence, video processing performance may suffer if the device applies the codec. At the same time, it is desirable to make use of new codecs as they become available if the hardware can support them, because such codecs can provide higher quality at the same bitrate (or vice versa).

Still further, the predefined rules applied by conventional codec selection algorithms tend to include fixed values that have historically been shown to yield good results in average cases. For example, one rule might instruct the device to use a particular software codec below a relatively low bitrate threshold, and then switch to a particular hardware codec when network conditions improve, and the bitrate increases above the threshold. Although these rules might make sense on average, in practice the optimal codec to be applied (in terms of balancing quality, battery consumption, and processing resources) depends on the complexity of the scene being recorded. For instance, if the video being recorded shows only relatively simple scene such as a user's face, the video quality may not significantly improve by switching to a more complex codec (although a more complex codec will still use increased processing and power resources). Despite this, conventional techniques may switch to the more complex codec based solely on the network conditions. By keeping to a simpler codec, the codec operates on fewer bits as compared to more complex codecs. Because the simpler codec works with less data, it may be possible to increase the video resolution more quickly than if a more complex codec were used.

Exemplary embodiments provide techniques for dynamically adjusting video codecs as a video call is ongoing. Several different aspects of codec selection are described, and it is contemplated that each capability could be employed separately or together.

According to a first embodiment, a sending device may consult a server and/or its own on-device list indicating codecs that will not work with the sending device (potentially in combination with a specified recipient device). That list may be generated based on on-device CPU tests that compare available codecs to CPU thresholds; if the device's CPU does not meet the threshold performance requirements for a codec, the codec may not be considered for use in a given network transaction.

Codecs may also or alternatively be added to the list in other ways. For instance, a hardware codec may be added to the list when it is known that the hardware codec of the sending device is incompatible with a corresponding hardware codec on a receiving device due to (for example) differences in the ways that the device manufacturers implemented the codec. This information may be learned in the processes described in connection with the second and third embodiments.

The list may include predetermined codec information from historical transactions observed by the device and/or a server. Alternatively or in addition, the list may be determined dynamically as video is being transmitted.

If a codec is on the list, in some embodiments it is not used during the testing described in the second and third embodiments. This saves time and resources because codecs known not to work well will not be tested to determine if they might yield a good balance of battery life and quality. This embodiment also improves overall video transmission quality, because codecs that are known not to work well will not be considered as an option during transmission; hence, video is only transmitted with codecs that are known to work well. Even in the case where a given mobile device transmits video for the first time, without having tested compatible codecs itself, it can rely on historical codec tests compiled by the intermediate server to avoid testing or using codecs that have been shown not to work well on other, similar devices or in similar contexts.

According to a second embodiment, codecs are selected or changed based on characteristics of the video being encoded. In these embodiments, a system may analyze the video being shot, identify features that define how much quality improvement is expected from switching a different codec, calculate the increased battery consumption from the new codec, and switch to the new codec only if the increase in quality if warranted by the increase in battery consumption.

Generally, a software codec may make a quality measurement available (e.g., through an API call). However, a hardware codec may not provide similar information. In order to determine or predict video quality achieved by a hardware codec, machine learning can be applied using proxies for video features (e.g., the brightness from the camera, a calculated amount of motion in the video, etc.).

In some cases, a video frame encoded by an encoder on a sending device may be provided to a decoder on the same sending device. In these cases, the output from the decoder may be compared to the original video frame supplied to the encoder in order to determine the quality. However, such a technique will consume more processing resources than retrieving a quality measurement with an API, so it may be used only in limited circumstances when this information cannot be obtained without consuming processor cycles.

The second embodiment allows devices to dynamically adjust the codec being applied rather than relying on static rules. Because the dynamic selection process considers the quality achieved by the codec in the context of the current scene in the video, it can avoid switching to more complex (and more battery- and processor-intensive) codecs when the increase in video quality does not warrant the tradeoff in decreased battery life. This result can be achieved even when the network conditions would traditionally dictate a change to a more complex codec.

According to a third embodiment, a list of supported hardware codecs may be dynamically pruned based on statistics such as video error rate, overshoot, and number or rate of dropped packets. This technique may be used to identify hardware codec mismatches, even when a device purports to support a given codec. If the measured statistics exceed a predetermined threshold, hardware codecs may be removed from the list of codecs supported by the device. Depending on the results, all hardware codecs might be banned (e.g., if overshoot is excessive, which can be a feature of hardware codecs) or specific hardware codecs may be banned. Alternatively, or a hardware codec may be applied, but with certain features disabled. In the latter case, the system may recalculate whether the increase in quality (which will be lower because of the reduced feature set) will still warrant changing to the new codec.

The third embodiment allows devices to recognize when there may be a mismatch in implementations of certain hardware codecs, allowing the device to remove such a codec from consideration (both dynamically during the current video transmission, and in future video transmissions when similar device types are involved). Thus, video transmission quality is increased, and error rates may be reduced. Moreover, overshoot can be avoided, which is especially advantageous for video calling applications deployed across a global market (where many user devices may be operating on slower or less reliable networks). Because the use of hardware codecs can be dynamically adjusted as a call is ongoing, the same techniques can be used on newer mobile devices operating in reliable, high-bandwidth networks and on older mobile devices operating in less reliable, low-bandwidth networks. This simplifies the design of video transmission applications supporting the described codec selection logic, allowing the application to be designed with shorter, more efficient code that can run on more devices. At the same time, it allows advanced hardware and networks to use their full capabilities while also supporting older devices and networks.

As a use example, consider a video call in which a first user operating a first type of mobile device calls a second user operating a second, different type of mobile device. When placing the call, the first user's device broadcasts the codecs that it supports. However, that list is filtered to remove codecs that the first user's device technically supports, but for which the first user's device does not have sufficient processing power to operate (and/or which have historically been shown to be incompatible between the two types of mobile devices). The second user's device responds with any corresponding codecs that the first user's device supports, and the second user's device also supports (potentially also filtered to remove those codecs for which the second user's device does not have sufficient processing power). Accordingly, when negotiating which codec to use, the user devices do not even consider those codecs that the devices will not be capable of efficiently operating.

After the video call begins, the first user device begins encoding video with a selected codec. At regular intervals, or when network conditions change, the first user device evaluates alternative codecs. To this end, the first user device calculates an expected improvement in video quality and an expected change in battery consumption. The first user device weighs the expected improvement against the decreased battery life, and switches to the new codec only if the tradeoff is warranted.

As the call proceeds, the first device switches to a hardware codec also supported by the second user device, but the second user device notes an increase in error rate and packet drops. The first device interprets this increase as a codec mismatch (e.g., two different devices implement the same hardware codec in different ways), and the list of supported codecs is pruned to remove the mismatched codecs. Alternatively, the first user device may consider disabling features of the hardware codec in an attempt to eliminate those features causing the mismatch, but first attempts to determine the video quality that will result when the features are disabled (to determine if continuing to use the codec still makes sense).

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-*a* may include components 122-1, 122-2, 122-3, 122-4, and 122-5. The embodiments are not limited in this context.

FIG. 1 depicts an exemplary exchange of data between devices that select and apply codecs to encode a stream of video data. In this example, a sending device 102 (such as a computer, mobile device, tablet, dedicated video conferencing device, etc.) is attempting to initiate a video call to a receiving device 106. An intermediate server 104 facilitates the setup of the video conference and the exchange of data between the devices.

In order to exchange video data, the sending device 102 and the receiving device 106 need to agree on one or more codecs that are mutually compatible with the devices. If no mutually compatible codecs exist, the devices may be unable to exchange video data. In order to determine which codecs are supported by both devices, the sending device 102 may transmit, as part of a call initiation 108, a list of codecs supported by the sending device 102. The intermediate server 104 may receive the call initiation 108 and relay it to the receiving device 106.

The call initiation 108 may include a list of codecs supported by the sending device 102. As described in more detail herein, this list of codecs may be filtered based on testing performed by the sending device 102 and/or the intermediate server 104. For example, the sending device 102 may technically support a first hardware codec but may know from previous experience or CPU testing that it does not have the processing capabilities to successfully or efficiently apply the first hardware codec. Accordingly, the list of available codecs that the sending device 102 advertises in the call initiation 108 may include all of, or only a subset of, the codecs that are available to the sending device 102.

In response to receiving the call initiation 108, the receiving device 106 may reply with a call acceptance 110. The call acceptance 110, among other things, may include a list of codecs that the receiving device 106 supports. In some cases, the receiving device may respond with a list of all codecs that it supports (potentially filtered in a similar manner as described above with respect to the sending device 102), or may only include those codecs supported by the receiving device 106 that are also supported by the sending device 102 (as determined from the call initiation 108). The former case has the advantage that, if multiple devices are participating in the call but one drops off, the remaining devices have a fuller understanding of the codecs supported in the environment. Thus, they may be able to apply a codec that was not originally supported by the device that dropped off.

Both the sending device 102 and the receiving device 106 now have an understanding of which codecs are supported by both devices. The sending device 102, which is encoding video data for transmission, may select one of the codecs to perform the encoding. The receiving device 106 may also encode video data for transmission and may do so using the same or a different codec than used by the sending device 102. The sending device 102 and receiving device 106 may thus transmit first encoded video data 112.

At some point, the sending device 102 may register a context change 114. The context change 114 may be a change in an underlying condition of the network (e.g., an increase or decrease in the bitrate achieved by the network), but may also be a change in the context of the video data. For instance, a change in the context of the video data might occur when a user switches a mobile device from using its front-facing camera to its rear facing camera or when the user's mobile device identifies a change in the location, position, or orientation of the camera (signifying a change in the scene being recorded). Another example of a context change may be when image processing software on the device recognizes that the complexity of the scene changes (e.g., when the user is initially recording a video of a face, but subsequently points the camera elsewhere and records video of a landscape).

In response to the context change, a different codec may be more suitable for encoding the video data. Accordingly, the sending device may select a new codec and encode the video data in a different manner, resulting in second encoded video data 116. This process may repeat until the video transmission ends.

Although FIG. 1 refers to one device as the "sender" and another device as the "receiver," in most cases the sender will also receive video data, and the receiver will also send video data. Moreover, although FIG. 1 depicts a video conference between a single sending device 102 and a single receiving device 106, an exchange of video data may involve more devices. For example, in a video conference between three or more devices, each device may send video data to, and receive video data from, each of the devices participating in the conference. In this case, during the call initiation 108, all of the devices in the conference may negotiate a list of codecs that are compatible with all devices. If devices are added to or removed from an ongoing video conference, the participating devices may renegotiate the codecs that are available for use.

Exemplary embodiments described herein may replace, augment, or eliminate some of the procedures described in connection with FIG. 1. Before describing these procedures, an overview of the various devices and data structures used is provided.

Figure 2:
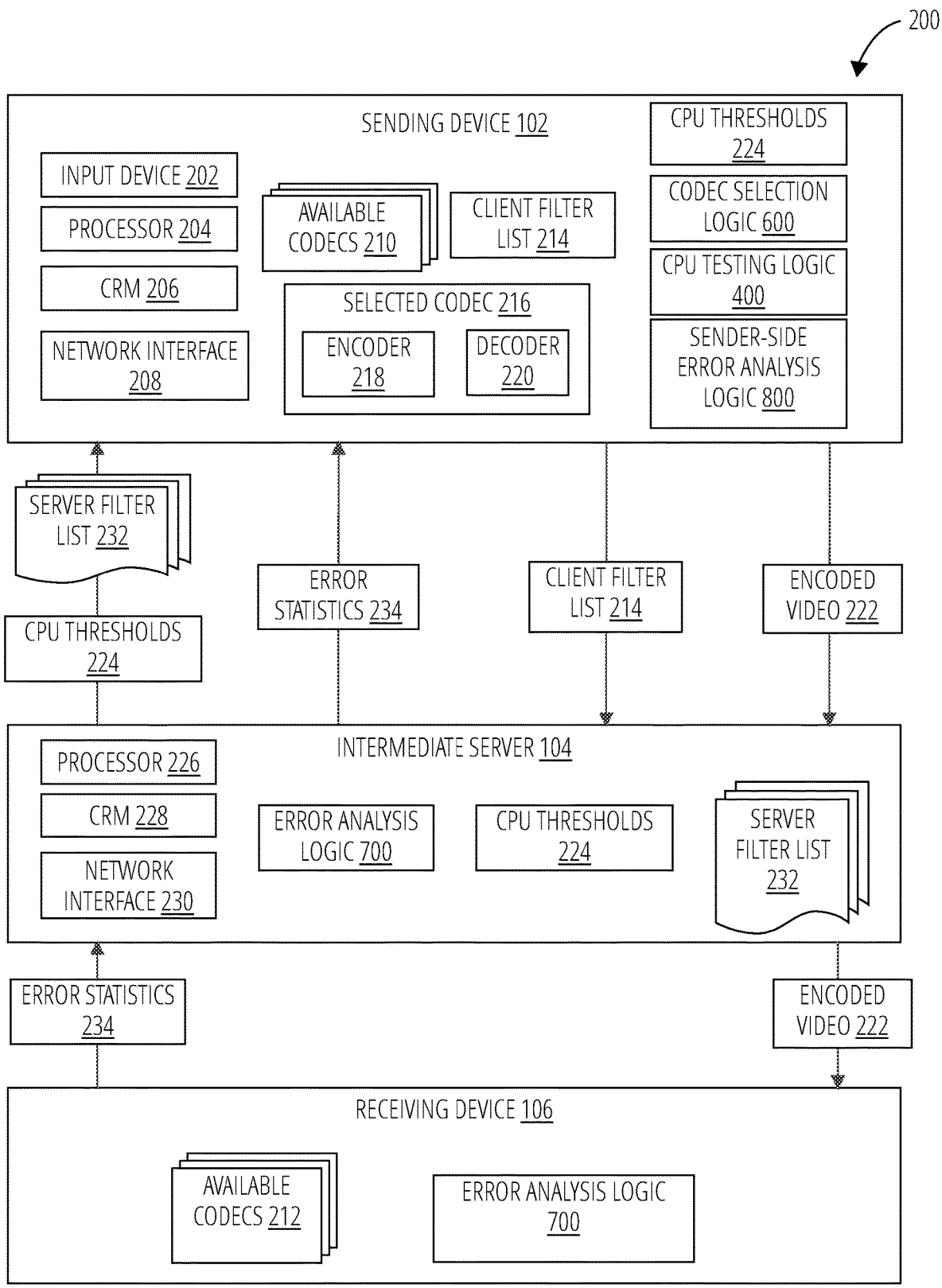
FIG. 2 depicts an exemplary environment 200 suitable for use with an embodiment.

FIG. 2 depicts an exemplary environment 200 including a sending device 102, an intermediate server 104, and a receiving device 106 suitable for use with an embodiment.

The sending device 102 may be any suitable device, such as a desktop or laptop computer, a mobile device such as a phone or tablet, a special-purpose videoconferencing device, or another type of device. The sending device 102 may include one or more input devices 202, such as a video camera, microphone, keyboard, etc. For example, a video camera and microphone on the sending device 102 may act together to record raw video data to be encoded and transmitted over a network.

The sending device 102 may also include a processor 204, which may include a hardware processor circuit, and a non-transitory computer readable medium 206 such as RAM, ROM, a hard drive, or other types of memory or storage. The non-transitory computer readable medium 206 may store instructions configured to cause the processor 204 to perform one or more processes; for example, the instructions may include instructions embodying the logic described below.

The non-transitory computer readable medium 206 may also store one or more applications, such as a video conferencing application that communicates with a corresponding video conferencing application on the receiving device 106. Among other things, the video conferencing logic may support call initiation logic 500, described in more detail in connection with FIG. 5.

The sending device 102 may include a network interface 208 for communicating over a network. The network interface 208 may be a wired or wireless interface, such as a network interface card (NIC), ethernet adapter, or other suitable interface.

The intermediate server 104 may also include a processor 226, a non-transitory computer readable medium 228, and a network interface 230.

The sending device 102 may support one or more codecs for encoding and decoding video data. Some of the codecs may be hardware codecs, and others may be software codecs. In some cases, a codec may be a hybrid hardware/software codec. The sending device 102 may maintain a list of available codecs 210, which may include every codec supported by the sending device 102. The receiving device 106 may maintain a corresponding list of available codecs 210 that are supported by the receiving device 106.

An example of a list of available codecs 210 is shown in FIG. 3A. The list of available codecs 210 includes a codec name 302, which identifies the codec supported by the device. The list may also include, for each codec, a codec type 304 (e.g., hardware or software) and a performance mapping 306. The performance mapping 306 maps conditions or contexts to an expected video quality produced by the codec. For example the performance mapping may accept, as an input, values such as the mobility, average brightness, and number of objects in a given video frame, the network bitrate and other current network conditions, the type of receiving device, etc. The performance mapping 306 and may map these inputs to a value indicative of the quality that can be achieved by the codec under the specified conditions, such as a resolution of the encoded video frames. The list of available codecs 210 may also include a value representing the power consumption 308 of the codec. As described in more detail below, the device may weigh the codec's power consumption against the quality achievable by the codec to determine if it is worthwhile to switch from an existing codec to a different codec. In some embodiments, if the codec has certain features that can be disabled, then the performance mapping 306 may include several different mappings (e.g., one for the codec as a whole, one for the codec with certain combinations of features disabled, one for the codec with other combinations of features disabled, etc.).

Returning to FIG. 2, although the sending device 102 and receiving device 106 may technically support a given codec, in some circumstances the codec may not work well. Some examples of these circumstances have been described above, but they include: when the device does not have a sufficiently powerful processor 204 to efficiently operate the codec; when a receiving device 106 would generally have sufficient processing power to decode a video stream, but multiple incoming video streams (e.g., during a video conference) are consuming too many processor resources; when a hardware codec on a sending device 102 has been implemented in a different way than a corresponding hardware codec on a receiving device 106; when network conditions lead to excessive overshoot by the codec; and other situations. Accordingly, each device may learn the situations in which codecs should not be applied and maintain a client filter list 214 indicating those codecs in the list of available codecs 210 that should not be advertised during the initial codec negotiation phases of a video exchange (or which should not be considered when applying a new codec in response to changing conditions during a video transmission).

An example of a client filter list 214 is depicted in FIG. 3B. The client filter list 214 includes each codec that has been filtered out from consideration, indexed based on the codec name 310. For each codec, a rationale 312 for why the codec was included in the client filter list 214 may optionally be provided. The rationale 312 may indicate the conditions under which the codec should not be used (e.g., if it is determined that certain types of receiving devices implement a hardware codec in a different manner than a sending device, the rationale 312 in the sending device's client filter list 214 may indicate that the codec should not be used to send video to those types of receiving devices, although the codec may still be used to encode video data for other types of compatible devices). In some cases, the rationale may indicate that the codec should not be used under any conditions (e.g., because the sending device does not have sufficient processing power to run the codec). Furthermore, the rationale 312 may indicate that the codec may be used under certain conditions, but that some features should be disabled under those conditions. If no rationale 312 is provided, the device may default to excluding the codec from consideration in all conditions.

Each client may provide a copy of its client filter list 214 to the intermediate server 104. Based on the information in the client filter list 214, the server may build its own server filter list 232, as illustrated in FIG. 3C. The server filter list 232 may identify each codec by codec name 314, and may also include information describing the context under which the codecs should not be employed. For example, the server filter list 232 may identify a sending client type 316 and a receiving client type 318. If a sending device 102 having the same type as the sending client type 316 is attempting to send video data to a receiving device 106 having the same type as the receiving client type 318, then the codec corresponding to the codec name 314 may be added to the client filter list 214. Thus, the sending device 102 will not advertise the codec as being available for use. In some embodiments, the sending device 102 may remove those codecs on the client filter list 214 from the list of available codecs 210 (effectively forgetting that the sending device 102 knows of the removed codecs in the first place), whereas in other embodiments the list of available codecs 210 may be maintained and may be pruned on a transmission-by-transmission basis using the client filter list 214.

The server filter list 232 may include additional information, such as information from the rationale 312 of the client list, a list of features that can be disabled for a given codec, etc.

Returning to FIG. 2, based on the list of available codecs 210 and the client filter list 214, the sending device 102 may select a codec to be used to encode video data. The selected codec 216 may include an encoder 218 configured to take raw video data and compress, resize, or otherwise manipulate the raw video data prior to transmission on a network. Each codec also includes a corresponding decoder 220 that can be used to decode video data encoded by the codec's encoder 218. The codec currently being applied may be selected by codec selection logic 600, described in more detail below in connection with FIG. 6.

After encoding the raw video data with the encoder 218, encoded video 222 is generated. This encoded video can be transmitted over the network to the receiving device 106. In some cases, the encoded video 222 may be received at one or more intermediate servers 104 before being received at the receiving device 106. The intermediate servers 104 may perform network routing tasks, in addition to other activities. In some embodiments, the intermediate servers 104 may examine the video data being transmitted (subject to approval by the participants in the video transmission) in order to optimize the transmission. The intermediate servers 104 might also examine error messages and network statistics to determine if the encoded video 222 is causing problems (e.g., indicating a mismatch in hardware codecs, overshoot in the network, etc.), and may flag this information for the sending device 102 and/or the receiving device 106 so that these devices can decide whether to update their client filter list 214. In other embodiments, the intermediate servers 104 may be end-to-end encrypted (E2EE) servers that are not capable of examining the encoded video 222 because it is in an encrypted form that cannot be decrypted by the intermediate servers 104.

The encoded video 222 may include a header indicating the selected codec 216 that was used to encode the video data. The receiving device 106 may consult the header metadata, identify the codec used to encode the data, and apply a corresponding codec to decode the data. Because the sending device 102 and the receiving device 106 negotiated compatible codecs during the initial stages of setting up the video transmission, the sending device 102 should have only used codecs that the receiving device 106 is capable of decoding.

As noted above, a given codec might be excluded from use if the codec uses more processing resources than a sending device 102 or receiving device 106 can reasonably provide. One way to identify such codecs would be to use them to encode or decode video data and then measure the load on the processor 204, excluding the codec from use if the processor load is consistently too high. However, this requires that each codec be individually tested by the device applying the codec, which is time consuming and drains processing resources. Moreover, if a given device is unable to fully support the codec, then the quality of the video transmission is likely to suffer until the device determines that it does not have sufficient processing resources and switches to another codec.

Accordingly, each device may maintain a list of CPU thresholds 224 associated with different codecs. The list of CPU thresholds 224 may indicate, for each codec, the amount of processing power required to run the codec efficiently. For example, as shown in FIG. 3D the CPU thresholds 224 may identify a codec on a codec name 320. For each codec identified, a CPU threshold value 322 may represent a minimum score on a processor stress test that the processor must be able to achieve in order to have a chance at running the codec efficiently.

Returning to FIG. 2, each client device may develop its own list of CPU thresholds 224 based on its own internal testing. However, CPU thresholds may also be developed at, or transmitted to, the intermediate server 104. Thus, the intermediate server 104 may maintain a list of CPU thresholds 224 based on historical tests of many devices, and may use these tests to develop its own list of CPU threshold values averaged over many different types of hardware. The intermediate server 104 may then transmit its list of CPU thresholds 224 to various client devices, which can use the server-derived CPU thresholds 224 to update their own local list of CPU thresholds 224. Thus, each client device can benefit from historical information gathered by the intermediate server 104, without the need to necessarily develop its own test of processing power.

Whether the list of CPU thresholds 224 is developed at the client, the intermediate server 104, or both, the local client device can run a processing power test (e.g., using the CPU testing logic 400, described in more detail in connection with FIG. 4) to generate a processor score. The local client device may then compare this score to the CPU threshold values 322 in the list of CPU thresholds 224 to determine which codecs can and cannot be run efficiently by the device. If the processor score is below the threshold value required for a given codec, the codec may be added to the client filter list 214.

As the encoded video 222 is transmitted by the sending device 102 and decoded by the receiving device 106, a number of possible error conditions may develop. For example, if the codec on the sending device 102 is encoding too much data for the current network conditions, the receiving device 106 may drop incoming packets (resulting in lost data). This results in a condition known as overshoot, which is common with some hardware codecs. In another example, a mismatch in implementations between the encoder 218 on the sending device 102 and the decoder 220 on the receiving device 106 may cause decoder errors.

Information about error conditions may be computed by the receiving device 106, the intermediate server 104, and/or the sending device 102. The resulting error statistics 234 may be sent to the sending device 102 and/or the intermediate server 104, so that each device can determine whether there is a problem with the codec being used and add that codec to its respective filter list. An example of error statistics 234 is depicted in FIG. 3E; in this example, the error statistics 234 include a list of decoder errors 324 reported by the receiving device 106 and a packet drop rate 326 (which may include a number, rate, or frequency of packet drops in the network). The error statistics 234 may be computed or analyzed by error analysis logic 700 and/or sender-side error analysis logic 800, as described in more detail below with respect to FIG. 7 and FIG. 8.

Figure 3:
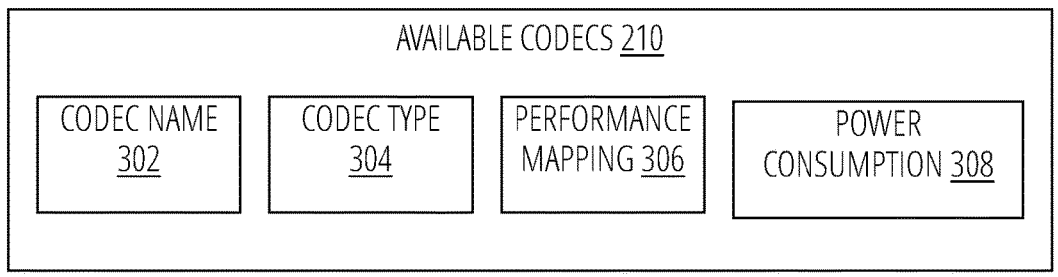
FIG. 3 depicts exemplary data structures suitable for use with an embodiment.
Figure 3:
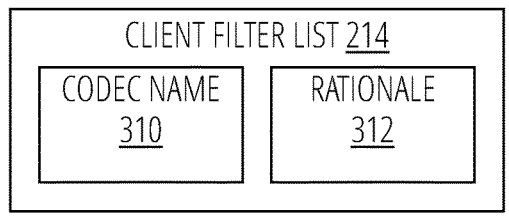
Figure 3:
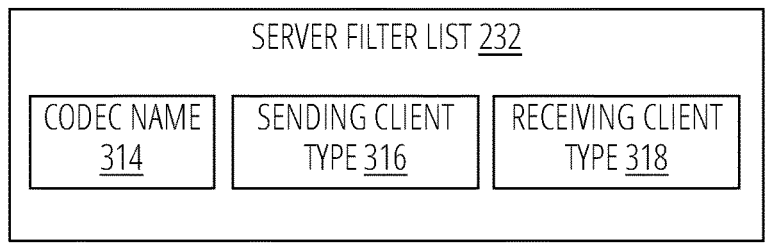
Figure 3:
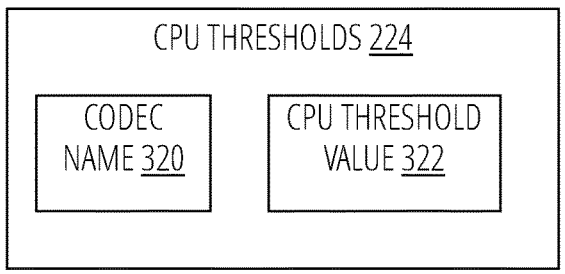
Figure 3:
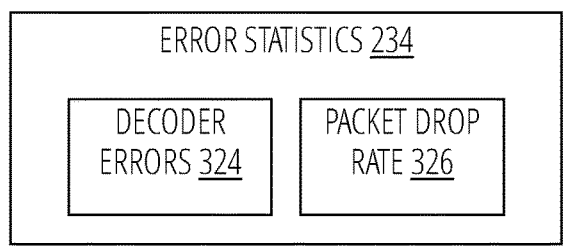

FIG. 3 depicts exemplary data structures suitable for use with an embodiment. Each of the depicted data structures has been discussed above in connection with FIG. 2.

Figure 4:
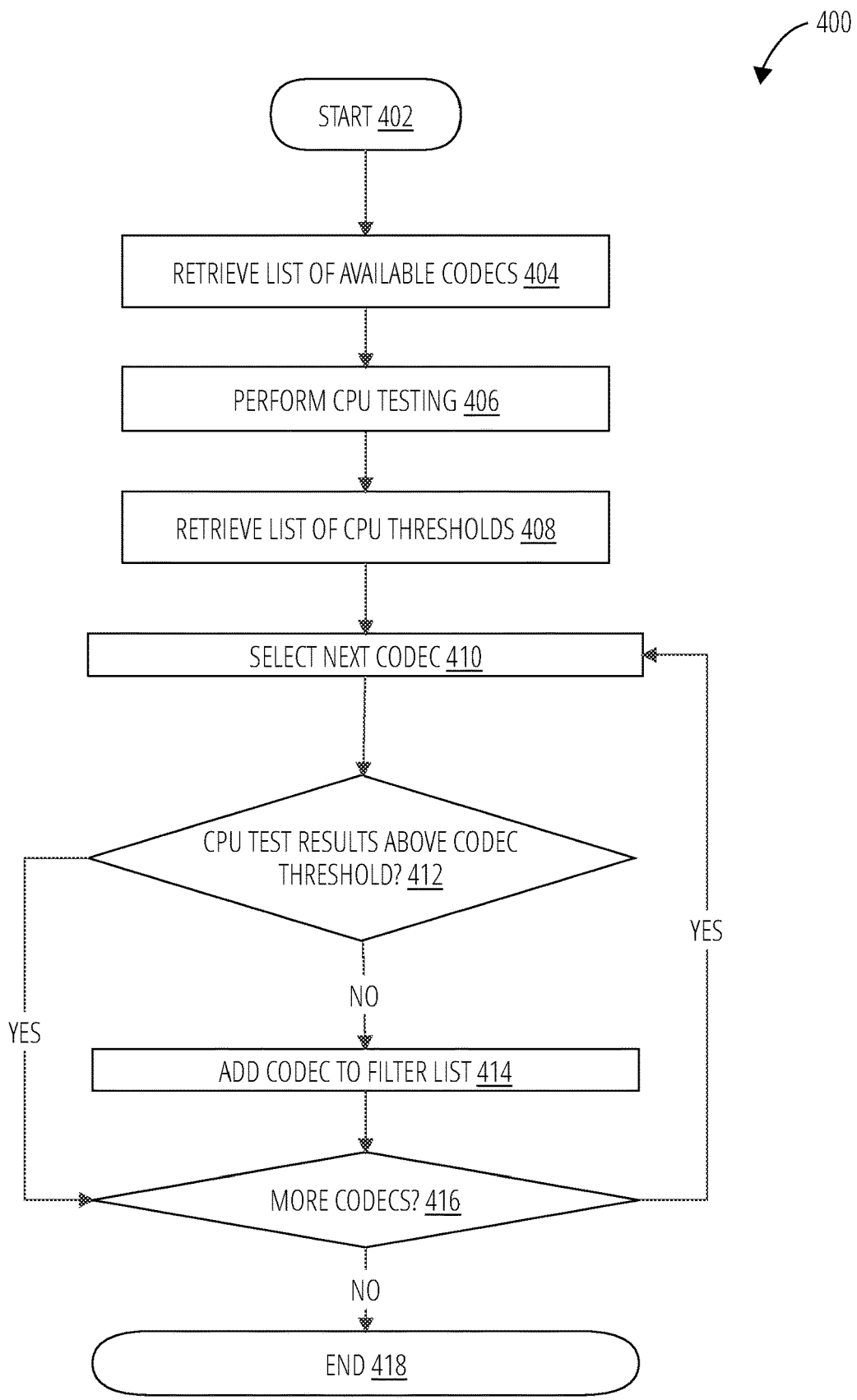
FIG. 4 illustrates exemplary CPU testing logic 400 in accordance with an embodiment.

FIG. 4 illustrates exemplary CPU testing logic 400 in accordance with an embodiment. The CPU testing logic 400 may be used to remove codecs from consideration when the local device does not have sufficient processing power to efficiently run the codecs (e.g., running the codec will use too great a proportion of the processor cycles of the device to run a minimum set of capabilities on the device, resulting in encoding of the video data that proceeds too slowly to support real-time streaming or transmission of the data).

The CPU testing logic 400 may be embodied as instructions stored on a non-transitory computer-readable medium and may be configured to cause a processor to perform actions corresponding to the logical blocks described below. The CPU testing logic 400 may be performed by the sending device 102, the receiving device 106, the intermediate server 104, or a combination of those devices.

Processing may start at start block 402, when the local device receives an instruction to perform CPU testing. At block 404, the local device retrieves the list of available codecs 210 from its memory or storage, where the list of available codecs 210 represents those codecs that the local device supports.

At block 406, the local device runs one or more processor tests. The processor tests may include stress tests that run the processor of the local device under different loads in differ-ent conditions, and may generate one or more scores representative of the processing power of the local device. For example, the processor tests may instruct the processor to perform complicated mathematical operations, compress blocks of data, search for prime numbers, encode video, encrypt blocks of data, sort data, run simulations across multiple threads, use multiple CPU cores, etc. The output of the processor tests may be a processor score, a frame rate achieved during video testing, a speed at which operations were performed, a number of operations that were performed, a rate of operations performed, etc. The output of the processor tests may represent the processing power of the local device's processor.

At block 408, the system retrieves a list of CPU thresholds 224. The list may be stored locally on the local device and/or may be stored on a remote server. If both the local device and the remote server maintain separate lists, the local device's list of CPU thresholds 224 may be updated with the (likely more detailed) information from the remote server. If the CPU threshold values 322 in the server's list of CPU thresholds 224 does not agree with the CPU threshold values 322 in the local device's list of CPU thresholds 224, then the action to be taken may vary depending on the application. For example, in some cases, the more conservative value may be used in order to reduce the chance that a system will not be capable of running a given codec. In some embodiments, the server's value may be used, since the server's value may be generated based on historical data from many devices, which is likely to be more accurate than the limited tests run by the local device. In other embodiments, the local device's value may be used under the assumption that a characteristic unique to the local device's context may be allowing the local device to run a codec that other, similarly powerful, devices have been unable to run. In still further embodiments, the values may be combined (e.g., by averaging them or taking a weighted combination).

At block 410, the system may select the first (next) codec for evaluation from the list of available codecs 210 retrieved at block 404. As previously noted, the list of available codecs 210 may include CPU threshold values 322 indicating the processing power required to efficiently run the codec.

At block 412, the local device may compare the CPU test results from block 406 to the codec threshold corresponding to the codec selected in block 410 in the list of CPU thresholds 224. If the CPU test results are not above the CPU threshold for the selected codec, then at block 414, the codec may be added to the local device's filter list (e.g., the client filter list 214). If the CPU test results are above the CPU threshold, then processing may proceed to block 416.

At block 412, it is possible that the codec will not be listed in the list of CPU thresholds 224, for example because the codec has not been previously tested. In that case, the codec may be permitted to remain in the list of available codecs 210 (e.g., it is not added to the client filter list 214), but the codec may be flagged for testing while it is running. If problems arise while the codec is being used (e.g., the CPU consistently exhibits a high load above a predetermined threshold amount, the encoder causes errors or program crashes, etc.), then the codec may be added to the filter list and a note may be made in the list of CPU thresholds 224 indicating that the processor value determined by the local device in block 404 was insufficient to support the codec (e.g., the CPU threshold value 322 for the codec in the list of CPU thresholds 224 may be set to "less than" the processor value). The CPU threshold value 322 may be refined over time, but it will be known that any device performing at or below the level of processor power of the local device will be insufficient to support the codec. This information may be provided to the intermediate server 104 so that the list of CPU thresholds 224 on the server can be updated and provided to other devices.

At block 416, the system may determine if more codecs remain to be evaluated. If so, processing returns to block 410 and the next codec is selected for evaluation. If not, the filter list has been updated with the codecs known to perform poorly given the processing capabilities of the local device. Processing may then proceed to block 418 and terminate.

Figure 5:
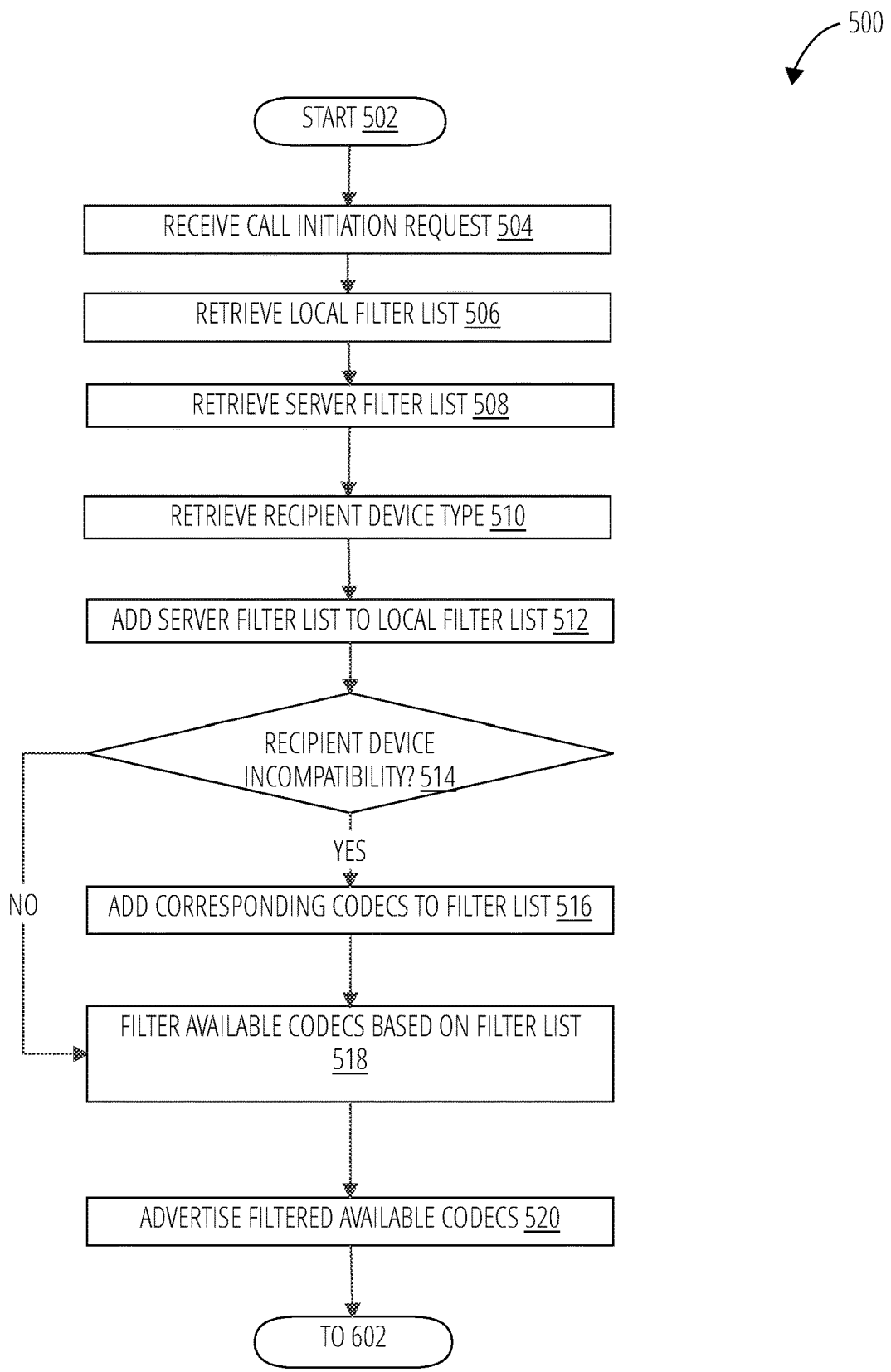
FIG. 5 illustrates exemplary call initiation logic 500 in accordance with an embodiment.

FIG. 5 illustrates exemplary call initiation logic 500 in accordance with an embodiment. The call initiation logic 500 may be performed when a video call is initiated and includes a codec negotiation procedure. One of ordinary skill in the art will recognize how the call initiation logic 500 may be modified to support other types of video transmissions, depending on the context.

The call initiation logic 500 may be embodied as instructions stored on a non-transitory computer-readable medium and may be configured to cause a processor to perform actions corresponding to the logical blocks described below. The call initiation logic 500 may be performed by the sending device 102, the receiving device 106, the intermediate server 104, or a combination of those devices.

Processing may begin at block 502. At block 504, a call initiation instruction may be received (e.g., when a video-conferencing application running on the local client device places an outgoing call or receives a request to join a call). Initiating the call may involve negotiating the codecs that can be used to encode and decode video during the call (e.g., those codecs that are compatible with or supported by both the sending device 102 and any receiving devices 106).

To that end, the system may filter its list of available codecs 210 to remove codecs known to perform poorly. Thus, at block 506 the system may retrieve its copy of a filter list containing codecs to be filtered out from the list of available codecs 210 supported by the device. For example, the if the call initiation logic 500 is running on the sending device 102, the device may retrieve its client filter list 214.

The local client filter list 214 may be supplemented by a similar server filter list 232 stored on a remote server. The server filter list 232 may incorporate filtering information from across multiple clients and multiple different contexts, and may have been gathered over a longer period of time than the client filter list 214. This may help to account for device-to-device variations, such as device age and other processes that might be using the device's processor when the codec was running. Accordingly, the device may retrieve a server filter list 232 at block 508. Because this list is incorporated into a client's own client filter list 214, servers can help to on-ramp new devices, avoiding the need for each device to independently develop its own client filter list 214 through trial and error. At block 512, the local system may add the server filter list to its own client filter list 214.

At block 510, the device may retrieve a device type associated with the recipient receiving device 106 (or the other device involved in the call initiation request received at block 504, as may be the case if the local device receives a call initiation from a sending device 102). For example, the video call may be facilitated by an intermediate server that can identify the device type of the other device. Alternatively, if the call initiation request at block 504 was a result of the other device calling the local device, the call initiation message may specify the device type of the other device. In yet another embodiment, the local device may transmit a call request message to the other device before beginning a codec negotiation process, receiving the type of the recipient device in return. Still further, the local device may proceed to negotiate codecs with the other device, potentially even beginning video transmission, and then learn the device type of the other device at that time.

Depending on the rationale 312 for including a codec in the filter list, it may be the case that some codecs are only incompatible with certain device combinations (for example, a hardware codec running on a device from a first manufacturer might be capable of interoperating with different device types from the same manufacturer, but might have been implemented differently on devices from different manufacturers). Therefore, at block 514, the device examines the filter list to determine if there are any known incompatibilities between the sending device's device type and the device type of the recipient device as determined at block 510. If so, the incompatible codecs may remain in the client filter list 214 at block 516 so that corresponding codecs can be removed from the list of available codecs. On the other hand, if a codec appears in the filter list because it is incompatible for certain receiving device combinations that are not implicated by the combination of the local device's device type and the device type of the other device determined at block 510, then the codec may remain in the list of available codecs 210.

After the filter list is completed and analyzed, at block 518 the device may filter its list of available codecs 210 to remove those codecs present on the filter list (with the exceptions for compatible codecs noted above). At block 520, the device may advertise the filtered list of available codecs as part of a call initiation procedure (see FIG. 1). The sending and receiving devices may negotiate a list of compatible codecs, and the sending device 102 may begin recording and transmitting video data using one of the codecs on the list. The initial codec may be selected based on network conditions, characteristics of the video being recorded, based on a default codec, or based on other factors. Processing may then proceed to block 602 in FIG. 6.

Figure 6:
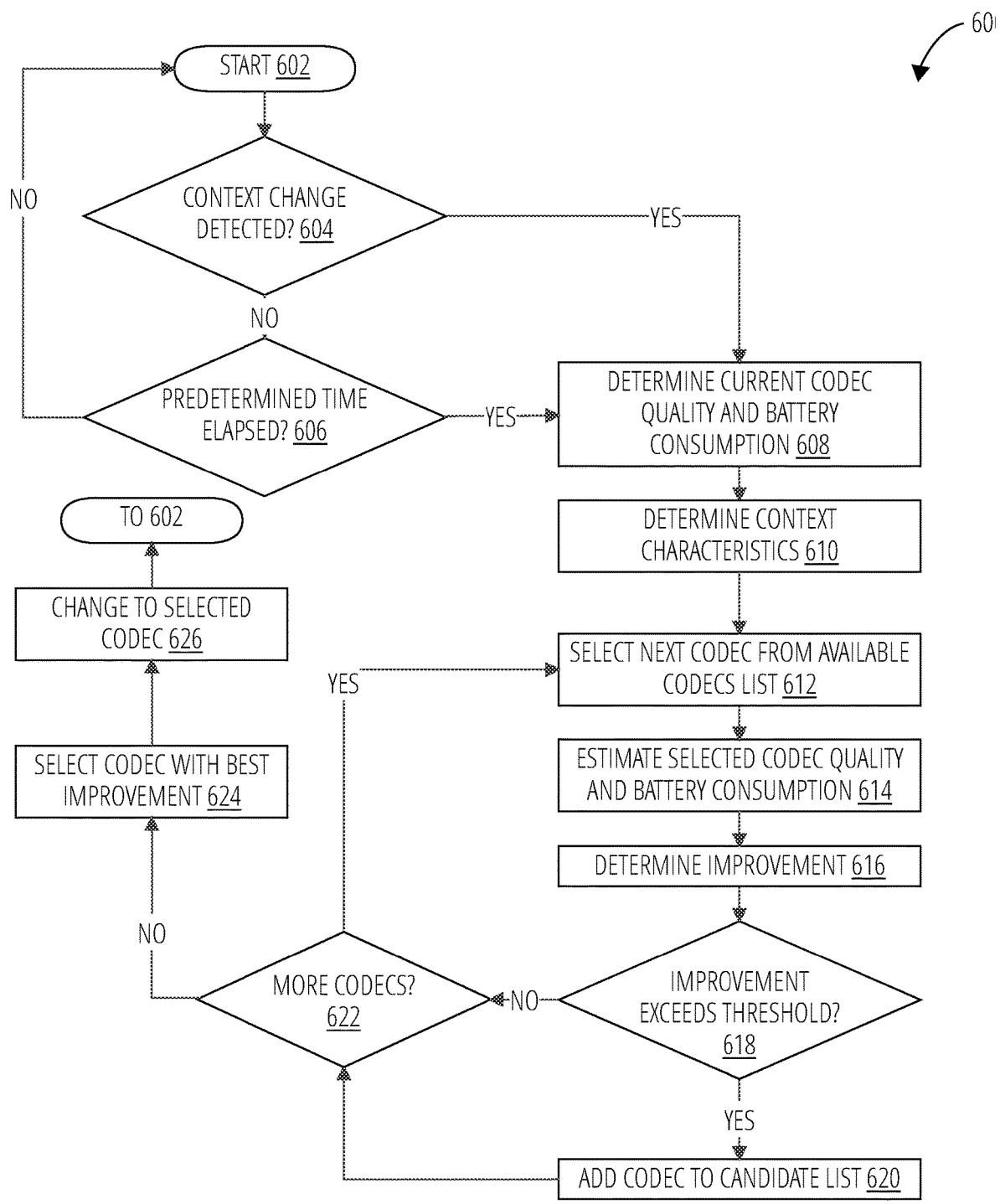
FIG. 6 illustrates exemplary codec selection logic 600 in accordance with an embodiment.

FIG. 6 illustrates exemplary codec selection logic 600 in accordance with an embodiment. The codec selection logic 600 may be used in connection with an ongoing video transmission, such as a video conference, in order to dynamically select codecs based on various factors including characteristics of the video being encoded.

The codec selection logic 600 may be embodied as instructions stored on a non-transitory computer-readable medium and may be configured to cause a processor to perform actions corresponding to the logical blocks described below. The codec selection logic 600 may be performed by the sending device 102, the receiving device 106, the intermediate server 104, or a combination of those devices.

Processing may begin at block 602 as video is encoded using an encoder of a first codec and transmitted to a receiving device. At block 604, the system may determine if a context has changed since a previous iteration of the codec selection process. A context change may involve a change in network conditions (e.g., reduced bandwidth), a change in the set of recipient devices that are receiving the video, or a change in the video being recorded. For example, the system may signal that a user has switched input devices 202 (e.g., flipping from a front-facing to a rear facing camera), indicating a change in the scene being filmed. The system may signal (e.g., based on positioning and/or accelerometer data) that the device has moved to a new location, or has been placed in a different orientation or position. The system may register a change in the scene being filmed in other ways, such as by calculating the amount of mobility, average brightness, or number of objects in the scene. In view of any of these conditions, the system may determine that it is time to evaluate whether a change to a different codec is warranted. Processing may then proceed to block 608.

If the context has not changed since the last iteration, the system may nonetheless reevaluate the codec being applied at predetermined time intervals (e.g., every minute, every two minutes, etc.). At block 606, the system may determine if such an interval has elapsed. If not, processing may return to block 602, and the system may wait a predetermined time period before determining again if the context has changed.

If the context changed since the last iteration or the predetermined time interval has elapsed, then beginning at block 608 the system may evaluate whether a change to a different codec is warranted. In exemplary embodiments, codecs are not changed based solely on network conditions, and a change is not made solely based on whether the new codec would improve the quality of the video being encoded. For instance, a more complex codec might theoretically improve the quality of video being encoded; however, in practice the improvement might be minimal if the scene is simple (such as a recording of a user's face). The question is, rather, whether changing to a more complex codec will improve the quality of the video sufficiently, given other considerations that may also be important (such as the reduced battery life resulting from using the more complex codec).

To this end, at block 608 the system determines the current codec encoding quality and battery consumption. The encoding quality may be, for instance, a quantization parameter or a peak signal-to-noise ratio (PSNR) value.

The encoding quality may be determined in several ways. For example, many software codecs expose a value that may represent, or may be used as a stand-in, for encoding quality (typically used in order to perform motion compensation).

Hardware codecs often do not make this information visible, and so it may be necessary to derive it in other ways. In some embodiments, machine learning may be employed based on features extracted from the frames of video data. This information may be supplemented by proxies for brightness and motion received from the camera. The machine learning algorithm may be applied to the scene being recorded and may determine an expected quality of the encoding using the current encoder.

In another example, the encoded video at the sending device may be provided to the corresponding decoder (also at the sending device). The decoded video may be compared to the original (pre-encoded) data, and a difference between the two may be used as an encoding quality value.

The current codec's battery consumption may be determined based on measurements at the local device indicating the level of power draw of the codec (e.g., based on the CPU load as the codec is applied), or based on the power consumption 308 from the list of available codecs 210.

At block 610, the system may determine context characteristics indicating the complexity of the scene (such as the amount of mobility, average brightness, or number and/or complexity of objects in the scene). This information may be used in connection with the performance mapping 306 of the other available codecs to determine if the other available codecs will improve the quality of the video being encoded.

To that end, at block 612 the system may select the first (next) available codec from the filtered list of available codecs 210. At block 614, the system may use the performance mapping 306 and power consumption 308 to compute an expected video quality that will be achieved by the selected codec under the conditions determined at block 610 (as well as the expected amount of power consumed to achieve that quality). At block 616, the system may use this information to calculate one or more improvement scores, representing an amount of improvement achieved by the selected codec as compared to the codec currently being applied. This score may be weighted by the increase (or decrease) in battery consumption by the selected codec, such that the score is lowered if the selected codec is expected to increase the power draw by the device. The weighting may be linear. Alternatively, in some cases the weighting may be non-linear (e.g., exponential) so that greater increases in power consumption are penalized to a greater degree.

At block 618, the system may determine whether the improvement score determined at block 616 exceeds a minimum threshold of improvement. That is, the system determines if the increase in quality, as weighted by the increase in battery consumption, warrants changing from the current codec. If the improvement is not significant and battery consumption increases or remains the same, the system may continue applying the existing codec.

If the improvement does exceed the threshold at block 618, then processing proceeds to block 620 and the selected codec is added to a candidate list. If not, then at block 622 the system determines if any more codecs remain to be evaluated, proceeding back to block 612 if so and to block 624 if not.

At block 624, a candidate list has been built up of zero or more codecs whose improvement scores exceed the minimum improvement threshold. If no such candidates have been found, processing may proceed back to block 602. If one such codec has been found, then the candidate codec may be applied to replace the existing codec at block 626. If more than one such codec is found, then at block 624 the codec having the best balance of quality improvement and battery consumption is selected (e.g., the codec with the highest improvement score), and that codec may be applied at block 626. Processing may then proceed back to block 602.

Figure 7:
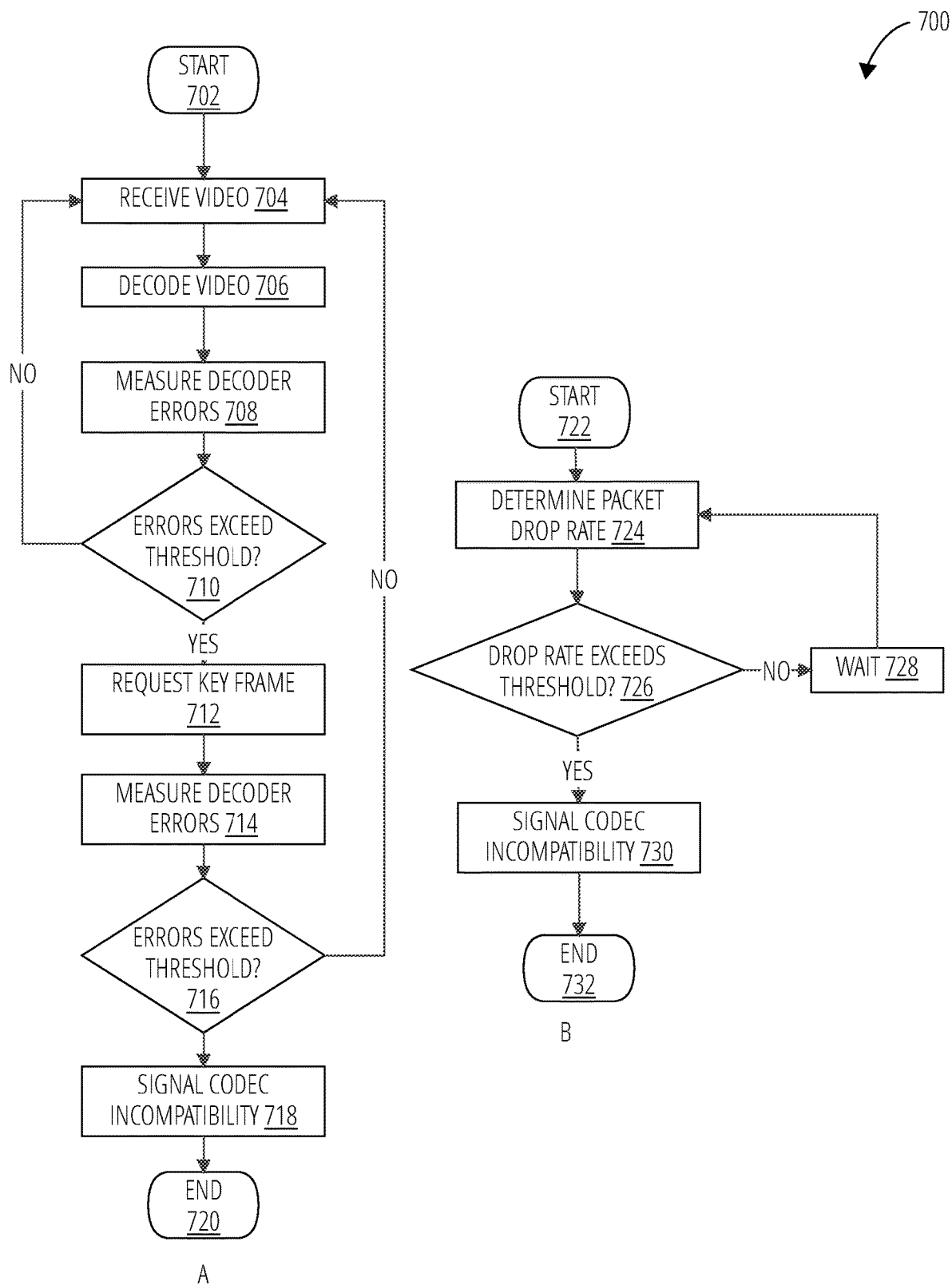
FIG. 7 illustrates exemplary error analysis logic 700 in accordance with an embodiment.

FIG. 7 illustrates exemplary error analysis logic 700 in accordance with an embodiment. The error analysis logic 700 includes logic for analyzing decoder errors (FIG. 7A) and for analyzing packet drop rates (FIG. 7B). These represent two ways of analyzing codec errors to determine if codecs implemented on two different devices might be incompatible or if other problems in the network are causing a codec to perform poorly; however, one of ordinary skill in the art will be aware that other ways to identify poor codec performance that could be used to signal a dynamic codec change also exist.

The error analysis logic 700 may be embodied as instructions stored on a non-transitory computer-readable medium and may be configured to cause a processor to perform actions corresponding to the logical blocks described below. The error analysis logic 700 may be performed by the receiving device 106 and/or the intermediate server 104, potentially with assistance from the sending device 102.

As shown in FIG. 7A, processing may begin at block 702 as video is transmitted to a receiving device. The receiving device may receive the encoded video at block 704. At block 706 the receiving device may identify the codec used to encode the video, and may provide the encoded video to a corresponding decoder.

At block 708, the system may measure any errors in the decoding process. For example, the decoder may report that one or more errors occurred; alternatively, the video may be analyzed to determine whether any encoding/decoding artifacts have been added, whether data is missing, whether any pixels are out of place or clearly incorrect, etc.

If the decoder errors rise to a level that exceeds a predetermined threshold ("YES" at block 710), then the system may attempt to reset a context of the video by requesting a key frame associated with the video data at block 712. The key frame may originate at the sending device 102, the intermediate server 104, or a buffer or memory on the receiving device 106. Reverting to the key frame may alleviate some or all of the decoder errors. If the decoder errors are measured again (block 714) and still exceed threshold ("YES" at block 716), then the system may determine that an inconsistency or incompatibility exists between the encoder on the sending device 102 and the decoder on the receiving device 106. For example, a hardware encoder may have a different implementation on the sending device 102 and the receiving device 106, leading to decoder errors. Thus, at block 718 the receiving device 106 may signal to the intermediate server 104 and/or the sending device 102 that the codecs are incompatible between the sending and receiving device types. This information may trigger a change in the codec being applied at the sending device 102, and may cause the sending/receiving device combination to be added to the client filter list 214 and/or server filter list 232 for the current codec.

If the decoder errors were not initially sufficient to indicate an incompatibility ("NO" at block 710), or the use of the key frame addressed the errors ("NO" at block 716), then processing may return to block 704 and additional video may be received and decoded. Otherwise, processing may proceed to block 720 and end.

Another problem may arise from overshoot, which can be dynamically addressed with the procedure illustrated in FIG. 7B.

Processing begins at block 722, where incoming encoded video is received by a receiving device 106. At block 724, the receiving device 106, intermediate server 104, or sending device 102 may identify a packet drop rate 326 associated with the video transmission. The packet drop rate may indicate how many packets are transmitted but not successfully delivered to the recipient device over a period of time (which might include a packet being received at the network interface 208 of the receiving device 106, but deleted due to a lack of buffer space or memory). If the packet drop rate is too high, this is indicative of the sending device 102 encoding video at a bitrate that is too high; either the network cannot transmit the video fast enough, or the decoder on the receiving device 106 cannot decode it fast enough. Consequently, some information is being lost, which can be especially problematic when the video is transmitted in real time as part of an ongoing video conversation. Such video cannot be queued or buffered indefinitely for future use, and so the video becomes choppy, lags, or exhibits other problems.

In some cases, a receiving device 106 may support a certain codec and may even have sufficient processing resources to run the codec under normal circumstances. However, on a video call in which multiple sending devices are sending video to the receiving device, the processing capabilities of the receiving device may be overwhelmed. This may also be indicated by an excessive number or rate of dropped packets, suggesting that the sending devices should switch to a simpler codec.

Accordingly, if the packet drop rate exceeds a predetermined threshold value ("YES" at block 726), then at block 730 the device may signal the sending device 102 of a problem with the codec. Processing may then proceed to block 732 and end.

If the packet drop rate does not exceed the predetermined threshold ("NO" at block 726), then at block 728 the system may wait a predetermined amount of time. Subsequently, processing may return to block 724 and the system may assess the packet drop rate for the next time interval.

Figure 8:
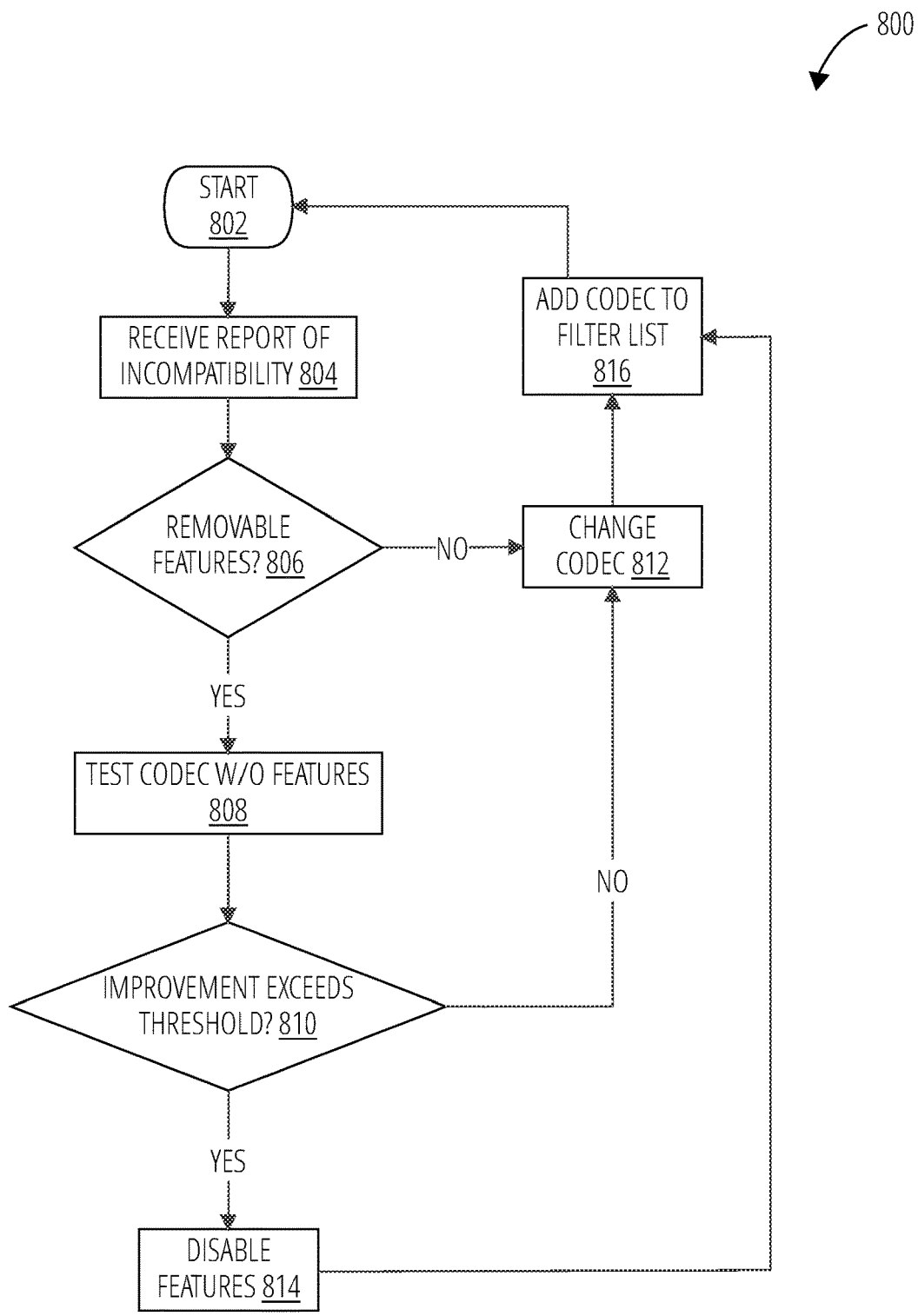
FIG. 8 illustrates exemplary sender-side error analysis logic 800 in accordance with an embodiment.

FIG. 8 illustrates exemplary sender-side error analysis logic 800 in accordance with an embodiment. The sender-side error analysis logic 800 may operate in conjunction with the error analysis logic 700 operating on the receiving device 106 and/or the intermediate server 104 to evaluate when a codec may need to be dynamically pruned from the list of available codecs 210 so that the codec is changed and not used for subsequent video encoding during (at least) the current transmission.

The sender-side error analysis logic 800 may be embodied as instructions stored on a non-transitory computer-readable medium and may be configured to cause a processor to perform actions corresponding to the logical blocks described below. The sender-side error analysis logic 800 may be performed by the sending device 102, potentially with assistance from the intermediate server 104 and/or the receiving device 106.

Processing begins at block 802, as the sending device 102 encodes and transmits video. At some point (block 804), the sending device 102 may receive a report of a codec incompatibility from the intermediate server 104 and/or the receiving device 106. The report of incompatibility may indicate that there is a mismatch between the sending device 102 and the receiving device 106 in their implementations of a codec (indicated by decoder errors), or that the codec used by the sending device 102 is overshooting the available bandwidth or processing power of the receiving device 106.

At block 806, the system determines whether the current codec can continue to be used by eliminating features from the codec. For example, some codecs may support complex b-frame features, but this support may be turned off to use simpler b-frames. If no removable features exist (e.g., the codec must either be used as-is or not at all), then at block 812 the codec may be changed. A new codec may be selected using the procedure for selecting an initial codec, or the procedure described in connection with blocks 612-626 of FIG. 6.

If the codec includes features that can be disabled, then it may be worthwhile to continue using the existing codec with a reduced feature set; however, this is not a given because there may be other codecs available that would outperform the diminished existing codec. Accordingly, at block 808, the existing codec (with features disabled) may be tested against the other available codecs using a procedure similar to the one described above in connection with blocks 612-626 of FIG. 6.

If the existing codec continues to outperform the other available codecs ("YES" at block 810), then at block 814 the features may be disabled and the existing codec may remain in use. Otherwise, processing may proceed to block 812 and the codec may be changed.

In any event, the codec indicated as incompatible at block 604 may be added to the client filter list 214 and/or server filter list 232 at block 816. A rationale 312 such as "excessive overshoot" or "hardware implementation incompatibility between <sender device type> and <recipient device type" may be indicated on the filter list, so that the codec can be removed from the list of available codecs 210 under similar conditions in the future. Processing may then return to block 802 and the system may await a new indication of incompatibility.

Figure 9:
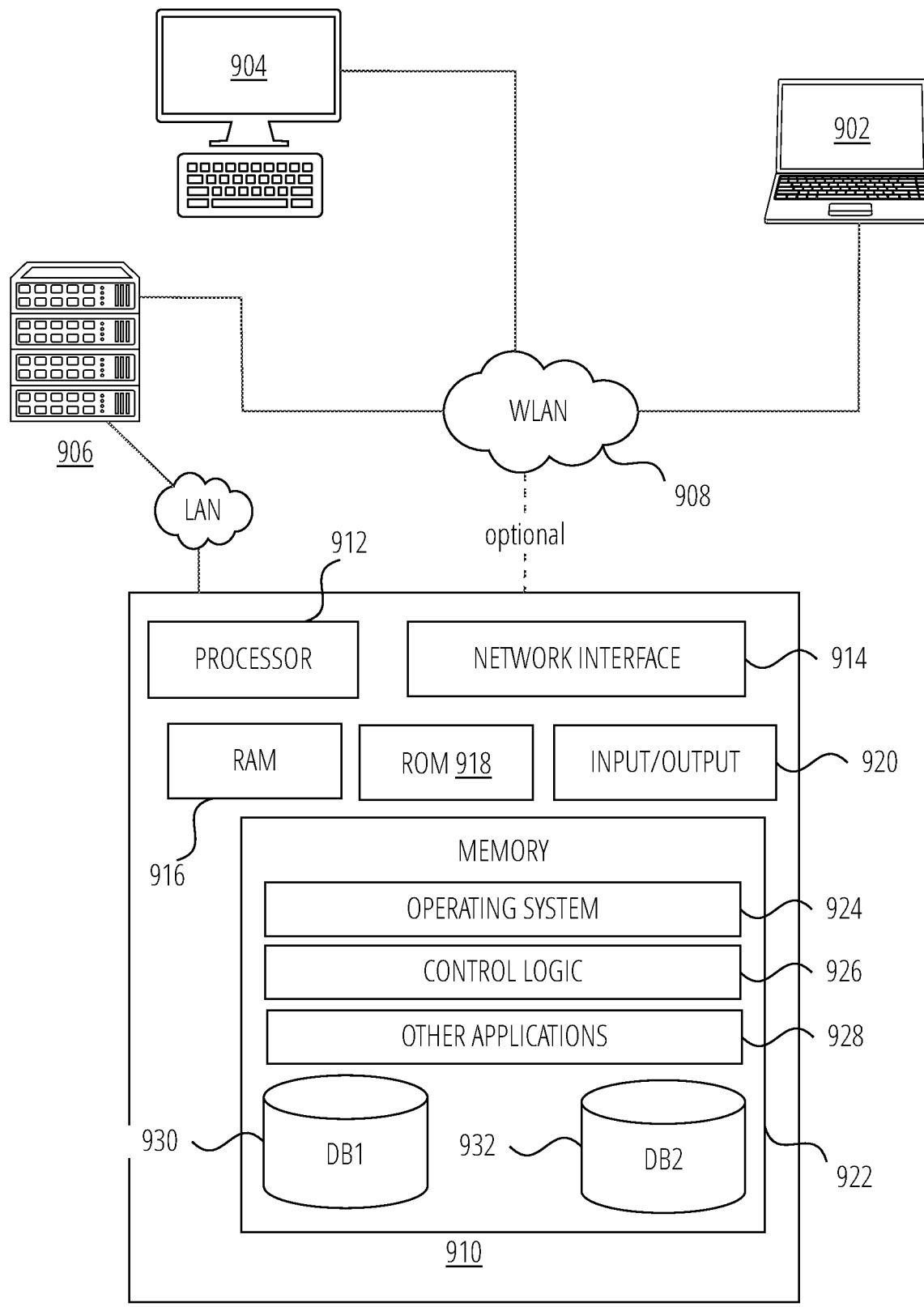
FIG. 9 depicts an illustrative computer system architecture that may be used to practice exemplary embodiments described herein.

FIG. 9 illustrates one example of a system architecture and data processing device that may be used to implement one or more illustrative aspects described herein in a standalone and/or networked environment. Various network nodes, such as a data server 910, web server 906, computer 904, and mobile device 902 may be interconnected via a wide area network 908 (WAN), such as the internet. Other networks may also or alternatively be used, including private intranets, corporate networks, LANs, metropolitan area networks (MANs) wireless networks, personal networks (PANs), and the like. The network 908 and devices shown are illustration purposes and may be replaced with fewer or additional computer networks or devices. A local area network (LAN) may have one or more of any known LAN topologies and may use one or more of a variety of different protocols, such as ethernet. The data server 910, web server 906, computer 904, mobile device 902 and other devices (not shown) may be connected to one or more of the networks via twisted pair wires, coaxial cable, fiber optics, radio waves or other communication media.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The data server 910 may provide overall access, control and administration of databases and control software for performing one or more illustrative aspects described herein. The data server 910 may be connected to the web server 906, through which users interact with and obtain data as requested. Alternatively, the data server 910 may act as a web server itself and be directly connected to the internet. The data server 910 may be connected to the web server 906 through the network 908 (e.g., the internet), via direct or indirect connection, or via some other network. Users may interact with the data server 910 using the remote computer 904 or mobile device 902, e.g., using a web browser to connect to the data server 910 via one or more externally exposed web sites hosted by web server 906.

The client computer 904 or mobile device 902 may be used in concert with the data server 910 to access data stored therein, or may be used for other purposes. For example, from the client computer 904, a user may access the web server 906 using an internet browser, as is known in the art, or by executing a software application that communicates with web server 906 and/or data server 910 over a computer network (such as the internet).

Servers and applications may be combined on the same physical machines, and retain separate virtual or logical addresses, or may reside on separate physical machines. FIG. 9 illustrates just one example of a network architecture that may be used, and those of skill in the art will appreciate that the specific network architecture and data processing devices used may vary, and are secondary to the functionality that they provide, as further described herein. For example, services provided by the web server 906 and data server 910 may be combined on a single server.

Each of the illustrated devices may be any type of known computer, server, or data processing device. The devices may each include a hardware processor 912 controlling overall operation of the device. The device may further include RAM 916, ROM 918, a network interface 914, input/output interfaces 920 (e.g., keyboard, mouse, display, printer, etc.), and memory 922.

Input/output interfaces 920 may include a variety of interface units and drives for reading, writing, displaying, and/or printing data or files.

The RAM 916, ROM 918, and Memory 922 may be non-transitory computer-readable mediums storing instructions configured to cause the respective devices to perform the techniques described herein, and may further store operating system software 924 for controlling overall operation of the data server 910, control logic 926 for instructing data server 910 to perform aspects described herein, and other application software 928 providing secondary, support, and/or other functionality which may or may not be used in conjunction with aspects described herein. Functionality of the devices may refer to operations or decisions made automatically based on rules coded into the control logic, made manually by a user providing input into the system, and/or a combination of automatic processing based on user input (e.g., queries, data updates, etc.).

Memory 922 may also store data used in performance of one or more aspects described herein, including a first database 932 and a second database 930. In some embodiments, the first database may include the second database (e.g., as a separate table, report, etc.). That is, the information can be stored in a single database, or separated into different logical, virtual, or physical databases, depending on system design. The illustrated devices may each have similar or different architecture to those described. Those of skill in the art will appreciate that the functionality as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The embodiments described above may be performed by a messaging architecture, an example of which is next described with reference to FIG. 10.

Figure 10:
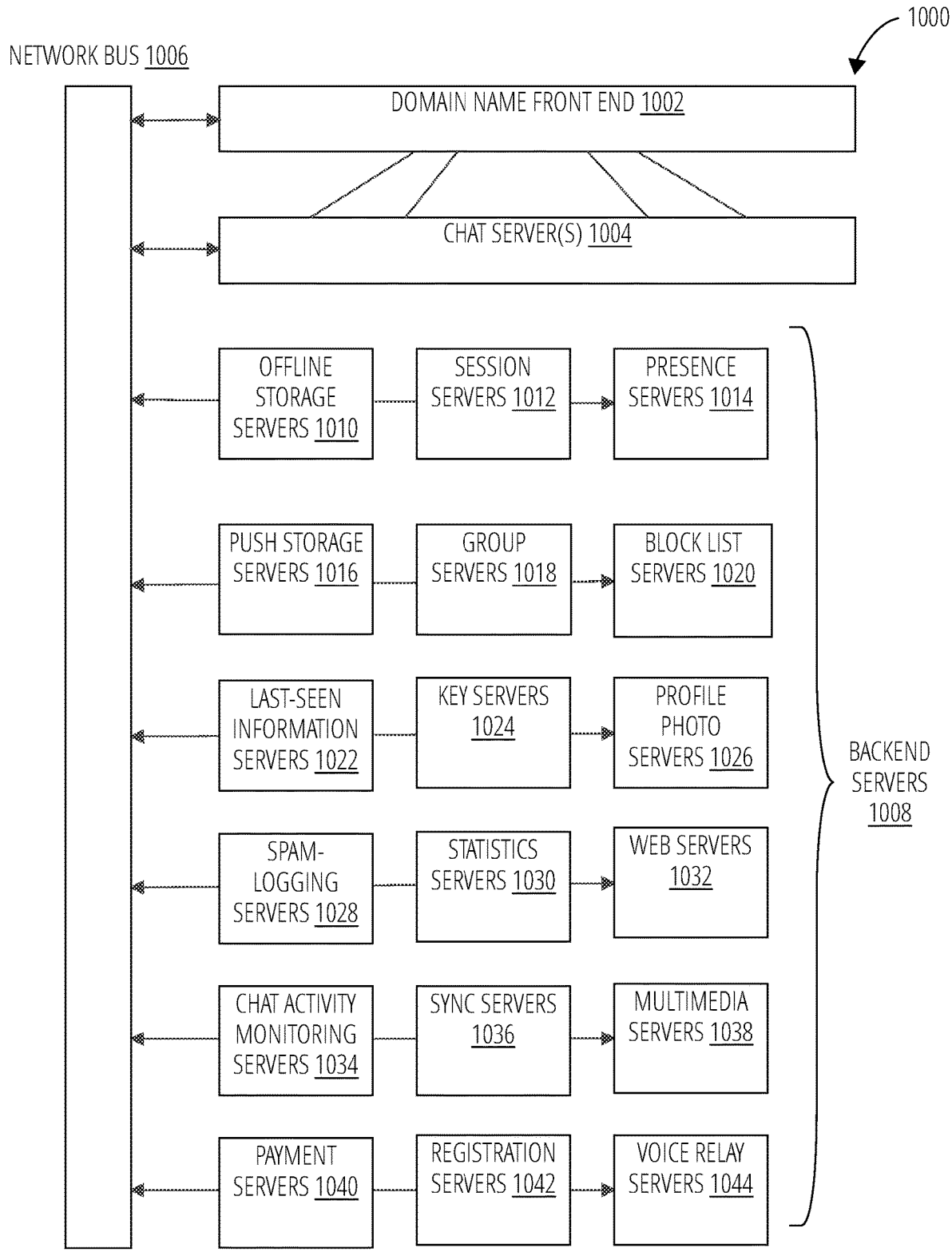
FIG. 10 illustrates an exemplary messaging service 1000 in accordance with one embodiment.

FIG. 10 illustrates an embodiment of a plurality of servers implementing various functions of a messaging service 1000 suitable for use with exemplary embodiments. It will be appreciated that different distributions of work and functions may be used in various embodiments of a messaging service 1000.

The messaging service 1000 may comprise a domain name front end 1002. The domain name front end 1002 may be assigned one or more domain names associated with the messaging service 1000 in a domain name system (DNS). The domain name front end 1002 may receive incoming connections and distribute the connections to servers providing various messaging services.

The messaging service 1000 may comprise one or more chat server(s) 1004. The chat server(s) 1004 may comprise front-end servers for receiving and transmitting user-to-user messaging updates such as chat messages. Incoming connections may be assigned to the chat server(s) 1004 by the domain name front end 1002 based on workload balancing.

The messaging service 1000 may comprise backend servers 1008. The backend servers 1008 may perform specialized tasks in the support of the chat operations of the front-end chat server(s) 1004. A plurality of different types of backend servers 1008 may be used. It will be appreciated that the assignment of types of tasks to different backend servers 1008 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated backend servers 1008 described herein may be divided between different servers of different server groups.

The messaging service 1000 may comprise one or more offline storage servers 1010. The one or more offline storage servers 1010 may store messaging content for currently-offline messaging clients in hold for when the messaging clients reconnect.

The messaging service 1000 may comprise one or more session servers 1012. The one or more session servers 1012 may maintain a session state of connected messaging clients.

The messaging service 1000 may comprise one or more presence servers 1014. The one or more presence servers 1014 may maintain presence information for the messaging service 1000. Presence information may correspond to user-specific information indicating whether or not a given user has an online messaging client and is available for chatting, has an online messaging client but is currently away from it, does not have an online messaging client, and any other presence state.

The messaging service 1000 may comprise one or more push storage servers 1016. The one or more push storage servers 1016 may cache push requests and transmit the push requests to messaging clients. Push requests may be used to wake messaging clients, to notify messaging clients that a messaging update is available, and to otherwise perform server-side-driven interactions with messaging clients.

The messaging service 1000 may comprise one or more group servers 1018. The one or more group servers 1018 may maintain lists of groups, add users to groups, remove users from groups, and perform the reception, caching, and forwarding of group chat messages.

The messaging service 1000 may comprise one or more block list servers 1020. The one or more block list servers 1020 may maintain user-specific block lists, the user-specific incoming-block lists indicating for each user the one or more other users that are forbidden from transmitting messages to that user. Alternatively or additionally, the one or more block list servers 1020 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 1000 may comprise one or more last seen last-seen information servers 1022. The one or more last seen last-seen information servers 1022 may receive, store, and maintain information indicating the last seen location, status, messaging client, and other elements of a user's last seen connection to the messaging service 1000.

The messaging service 1000 may comprise one or more key servers 1024. The one or more key servers may host public keys for public/private key encrypted communication.

The messaging service 1000 may comprise one or more profile photo servers 1026. The one or more profile photo servers 1026 may store and make available for retrieval profile photos for the plurality of users of the messaging service 1000.

The messaging service 1000 may comprise one or more spam-logging servers 1028.

The one or more spam-logging servers 1028 may log known and suspected spam (e.g., unwanted messages, particularly those of a promotional nature). The one or more spam-logging servers 1028 may be operative to analyze messages to determine whether they are spam and to perform punitive measures, in some embodiments, against suspected spammers (users that send spam messages).

The messaging service 1000 may comprise one or more statistics servers 1030. The one or more statistics servers may compile and store statistics information related to the operation of the messaging service 1000 and the behavior of the users of the messaging service 1000.

The messaging service 1000 may comprise one or more web servers 1032. The one or more web servers 1032 may engage in hypertext transport protocol (HTTP) and hypertext transport protocol secure (HTTPS) connections with web browsers.

The messaging service 1000 may comprise one or more chat activity monitoring servers 1034. The one or more chat activity monitoring servers 1034 may monitor the chats of users to determine unauthorized or discouraged behavior by the users of the messaging service 1000. The one or more chat activity monitoring servers 1034 may work in cooperation with the spam-logging servers 1028 and block list servers 1020, with the one or more chat activity monitoring servers 1034 identifying spam or other discouraged behavior and providing spam information to the spam-logging servers 1028 and blocking information, where appropriate to the block list servers 1020.

The messaging service 1000 may comprise one or more sync servers 1036. The one or more sync servers 1036 may sync the messaging service 1000 with contact information from a messaging client, such as an address book on a mobile phone, to determine contacts for a user in the messaging service 1000.

The messaging service 1000 may comprise one or more multimedia servers 1038. The one or more multimedia servers may store multimedia (e.g., images, video, audio) in transit between messaging clients, multimedia cached for offline endpoints, and may perform transcoding of multimedia.

The messaging service 1000 may comprise one or more payment servers 1040. The one or more payment servers 1040 may process payments from users. The one or more payment servers 1040 may connect to external third-party servers for the performance of payments.

The messaging service 1000 may comprise one or more registration servers 1042. The one or more registration servers 1042 may register new users of the messaging service 1000.

The messaging service 1000 may comprise one or more voice relay servers 1044. The one or more voice relay servers 1044 may relay voice-over-internet-protocol (VoIP) voice communication between messaging clients for the performance of VoIP calls.

In some embodiments, the messaging service 1000 may be an end-to-end encrypted (E2EE) messaging service, in which a sending device encrypts information for decryption by a receiving device. The intermediate servers of the messaging service 1000 may assist in the setup of an E2EE session, and may facilitate delivery of communications between the devices, but may be unable to decrypt (and therefore access) the content of the communications. In an E2EE environment, some adjustments may need to be made to procedures that would be performed by the server in a non-E2EE environment (eliminating these procedures, adjusting them, or moving them to one or more of the client devices).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art will recognize that many further combinations and permutations are possible. Accordingly, the novel architecture is intended to embrace all such alterations, modifications and variations that fall within the spirit and scope of the appended claims.

What is claimed is:

1. A method comprising:
   encoding video data using a first codec;
   receiving an instruction to reevaluate the first codec;
   determining an expected improvement in quality that a second codec is expected to achieve over the first codec;
   determining an expected change in power usage by the second codec;
   switching to the second codec if a combination of the expected improvement in quality and the expected change in power usage meets a predetermined requirement, wherein switching to the second codec comprises calculating an improvement score based on the expected improvement in quality and the expected change in power usage, and switching to the second codec only if the improvement score exceeds a predetermined threshold value; and
   encoding video data using the second codec.

2. The method of claim 1, wherein the instruction to reevaluate the first codec is received in response to detecting a change in a context of the video data.

3. The method of claim 2, wherein detecting the change in the context of the video data comprises one or more of detecting a change in a recording device capturing the video data, detecting a change in a scene recorded in the video data, or detecting a change in a location or orientation of a device capturing the video data.

4. The method of claim 1, further comprising:
   determining that a third codec is available to encode the video data;
   determining that the third codec is on a filter list of codecs that are excluded from use; and
   refraining from evaluating the third codec in response to receiving the instruction to reevaluate the first codec.

5. The method of claim 4, further comprising building the filter list by:
   selecting a candidate codec available to a local device;
   retrieving a list of processor thresholds representing an amount of processing power used to operate respective codecs;
   running a processor test on the local device to compute a processor score;
   determining that the processor score is below a threshold value associated with the candidate codec on the list of processor thresholds; and
   adding the candidate codec to the filter list when the processor score is below the threshold value.

6. The method of claim 4, further comprising building the filter list by:
   determining that the third codec is on a list of codecs that are compatible with a sending device and a receiving device;
   operating the third codec to encode the video data at the sending device;
   receiving a measurement of one or more of: decoder errors associated with operating a decoder corresponding to the codec, a number of dropped packets when transmitting the video data, or an amount of overshoot associated with transmitting the video data;
   determining that the measurement exceeds a predetermined threshold; and
   adding the third codec to the filter list in response to the measurement exceeding the predetermined threshold.

7. A non-transitory computer-readable storage medium, the computer-readable storage medium including instructions that when executed by a computer, cause the computer to:
   encode video data using a first codec;
   receive an instruction to reevaluate the first codec;
   determine an expected improvement in quality that a second codec is expected to achieve over the first codec;
   determine an expected change in power usage by the second codec;
   switch to the second codec if a combination of the expected improvement in quality and the expected change in power usage meets a predetermined requirement, wherein switching to the second codec comprises calculating an improvement score based on the expected improvement in quality and the expected change in power usage, and switching to the second codec only if the improvement score exceeds a predetermined threshold value; and
   encode video data using the second codec.

8. The computer-readable storage medium of claim 7, wherein the instruction to reevaluate the first codec is received in response to detecting a change in a context of the video data.

9. The computer-readable storage medium of claim 8, wherein detecting the change in the context of the video data comprises one or more of detecting a change in a recording device capturing the video data, detecting a change in a scene recorded in the video data, or detecting a change in a location or orientation of a device capturing the video data.

10. The computer-readable storage medium of claim 7, wherein the instructions further configure the computer to:
    determine that a third codec is available to encode the video data;
    determine that the third codec is on a filter list of codecs that are excluded from use; and
    refrain from evaluating the third codec in response to receiving the instruction to reevaluate the first codec.

11. The computer-readable storage medium of claim 10, wherein the instructions further configure the computer to build the filter list by:
    select a candidate codec available to a local device;
    retrieve a list of processor thresholds representing an amount of processing power used to operate respective codecs;
    run a processor test on the local device to compute a processor score;
    determine that the processor score is below a threshold value associated with the candidate codec on the list of processor thresholds; and
    add the candidate codec to the filter list when the processor score is below the threshold value.

12. The computer-readable storage medium of claim 10, wherein the instructions further configure the computer to build the filter list by:
    determine that the third codec is on a list of codecs that are compatible with a sending device and a receiving device;
    operate the third codec to encode the video data at the sending device;
    receive a measurement of one or more of: decoder errors associated with operating a decoder corresponding to the codec, a number of dropped packets when transmitting the video data, or an amount of overshoot associated with transmitting the video data;

determine that the measurement exceeds a predetermined threshold; and add the third codec to the filter list in response to the measurement exceeding the predetermined threshold.

13. A computing apparatus, the computing apparatus comprising:

a processor; and a memory storing instructions that, when executed by the processor, configure the apparatus to:

encode video data using a first codec;

receive an instruction to reevaluate the first codec;

determine an expected improvement in quality that a second codec is expected to achieve over the first codec;

determine an expected change in power usage by the second codec;

switch to the second codec if a combination of the expected improvement in quality and the expected change in power usage meets a predetermined requirement, wherein switching to the second codec comprises calculating an improvement score based on the expected improvement in quality and the expected change in power usage, and switching to the second codec only if the improvement score exceeds a predetermined threshold value; and encode video data using the second codec.

14. The computing apparatus of claim 13, wherein the instruction to reevaluate the first codec is received in response to detecting a change in a context of the video data, the change in context comprising a change in a recording device capturing the video data, a change in a scene recorded in the video data, or a change in a location or orientation of a device capturing the video data.

15. The computing apparatus of claim 13, wherein the instructions further configure the apparatus to:

determine that a third codec is available to encode the video data;

determine that the third codec is on a filter list of codecs that are excluded from use; and refrain from evaluating the third codec in response to receiving the instruction to reevaluate the first codec.

16. The computing apparatus of claim 15, wherein the instructions further configure the apparatus to build the filter list by:

select a candidate codec available to a local device;

retrieve a list of processor thresholds representing an amount of processing power used to operate respective codecs;

run a processor test on the local device to compute a processor score;

determine that the processor score is below a threshold value associated with the candidate codec on the list of processor thresholds; and add the candidate codec to the filter list when the processor score is below the threshold value.

17. The computing apparatus of claim 15, wherein the instructions further configure the apparatus to build the filter list by:

determine that the third codec is on a list of codecs that are compatible with a sending device and a receiving device;

operate the third codec to encode the video data at the sending device;

receive a measurement of one or more of: decoder errors associated with operating a decoder corresponding to the codec, a number of dropped packets when transmitting the video data, or an amount of overshoot associated with transmitting the video data;

determine that the measurement exceeds a predetermined threshold; and add the third codec to the filter list in response to the measurement exceeding the predetermined threshold.

* * * * *